March 12, 1957  P. L. ROBERTS  2,784,854
CONVERTIBLE TRUCK BODY
Filed July 22, 1954  3 Sheets-Sheet 2
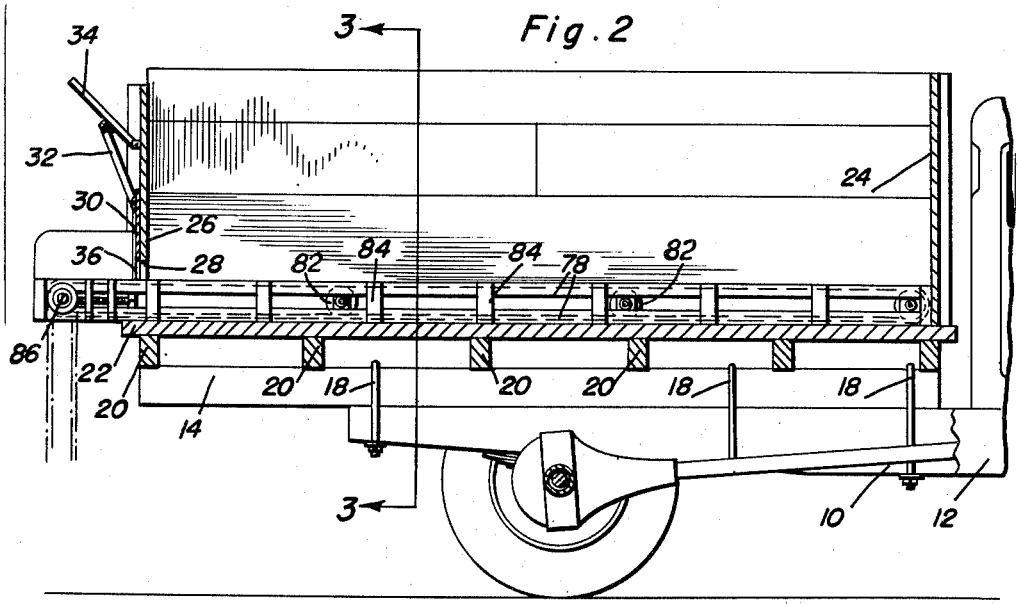
Fig. 2
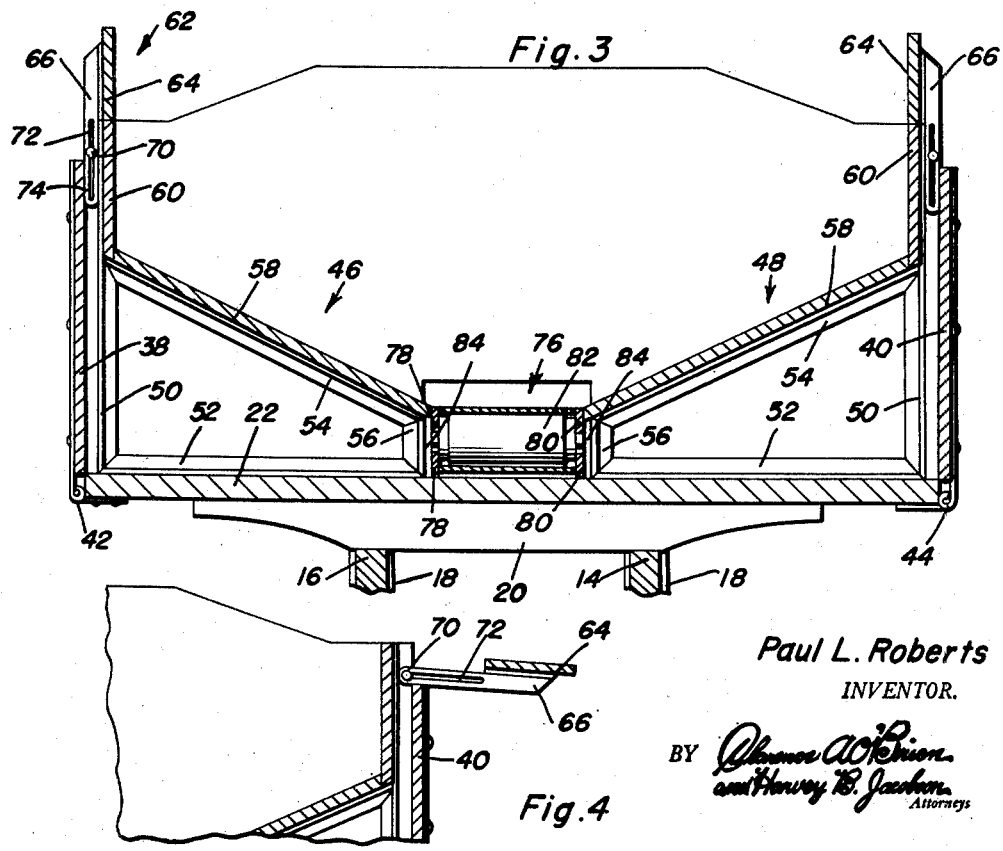
Fig. 3
Fig. 4
Paul L. Roberts
INVENTOR.
BY *[signatures]*
Attorneys

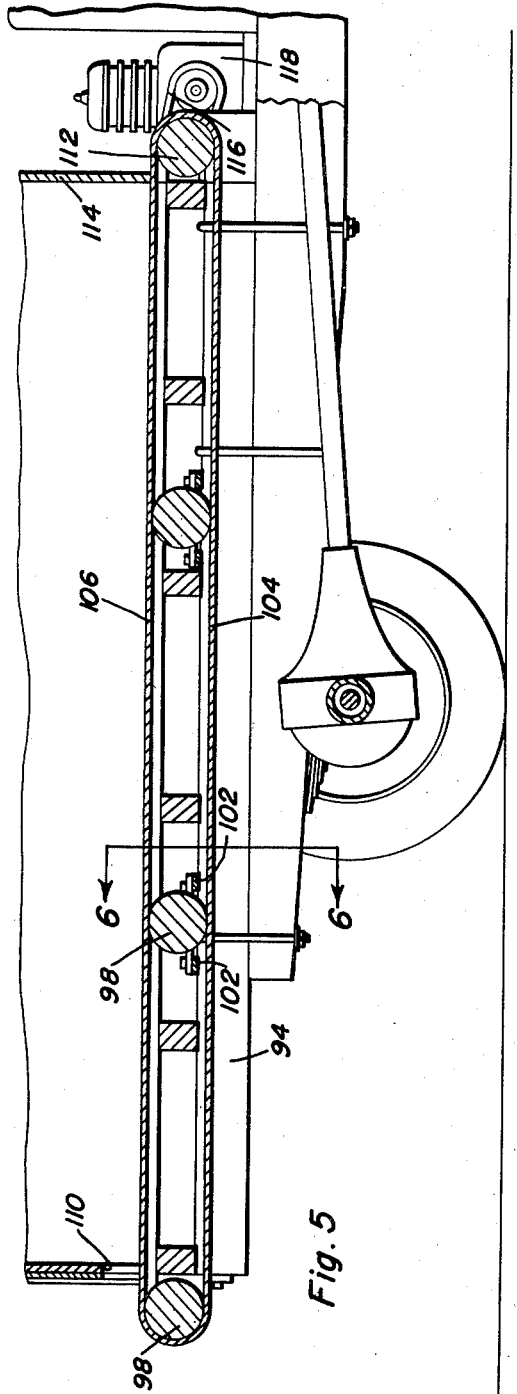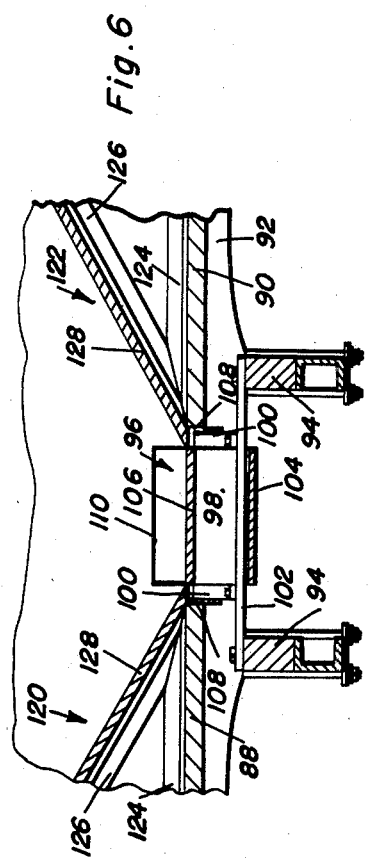

United States Patent Office 2,784,854
Patented Mar. 12, 1957

2,784,854

CONVERTIBLE TRUCK BODY

Paul L. Roberts, Twin Falls, Idaho

Application July 22, 1954, Serial No. 445,084

2 Claims. (Cl. 214—83.36)

This invention relates to vehicle bodies and has for its primary object the provision of a convertible truck body wherein a conventional flat bed vehicle body may be readily and quickly converted to a sloping bottom body having conveyor means therein for discharging material through the end gate of the body.

A further object of this invention is to provide improvements in convertible truck bodies in which unitary and rigid bunk members are utilized in converting a flat bed type body into a body having sloping bottom wall portions.

Still another object of this invention is to provide a convertible truck body bunk member of unitary construction which incorporates a novel and improved vertical extension movable between a laterally projecting inoperative position and a vertical operative position wherein it provides a vertical extension for the sides of the bunk.

A still further object of this invention is to provide an improved convertible truck body and certain modifications thereof in which a conveyor mechanism is permanently attached to the vehicle body and is preferably driven by power means mounted on the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a longitudinal vertical section taken through the body;

Figure 3 is an enlarged transverse vertical section taken substantially along the plane of section line 3—3 in Figure 2;

Figure 4 is a vertical section taken through one side of the body and showing the extension member in its inoperative position;

Figure 5 is a longitudinal vertical section taken through a modified form of body construction; and Figure 6 is an enlarged vertical transverse section taken substantially along the plane of section 6—6 in Figure 5.

Figure 1:
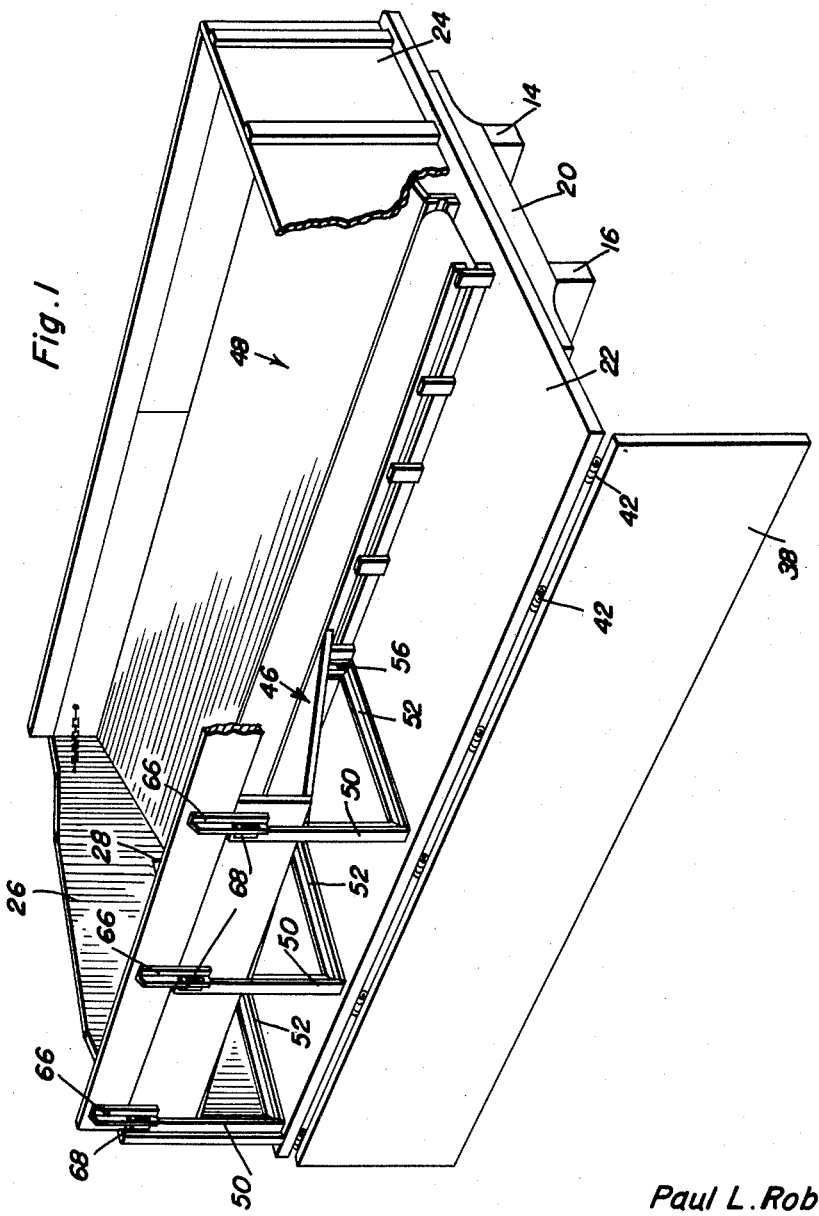
Figure 1 is a perspective view of the improved body construction.

Referring now more particularly to Figures 1–4, reference numerals 10 and 12 indicate the conventional main frame members of a truck body upon which are mounted, as is conventional, the wooden frame members 14 and 16 as by suitable U-bolts 18, or the like. In turn, cross pieces 20 are mounted on the members 14 and 16 and support a horizontal flat floor member 22 which normally forms the main bed portion of the vehicle body.

A forward end wall 24 is rigidly and permanently secured to the forward end of the bed floor 22 and at the rear end is provided a swingable tailgate member 26 having a tailgate opening 28 therethrough which is provided with a conventional slide cover member 30 operated by a link member 32 secured to a manually operable handle 34, the plate being guided in the usual vertical rail members 36.

A pair of side wall members 38 and 40 are swingably mounted as by hinges 42 and 44 to opposite sides of the bed floor 22 and it is to be noted that any desired means may be provided for maintaining the side walls in normally vertical position.

The body above described forms a more or less conventional body structure of the type normally utilized in conveying beets, and like articles from the fields where they are picked, to a discharge point and it is to be noted that such vehicle bodies are normally utilized only for this particular and specific use. One of the purposes of the hereinafter described invention is to permit the above described conventional body construction to be utilized for the purposes of conveying grain, potatoes and like produce and for providing a suitable discharge means therefor. In utilizing the conventional body for produce, such as beets, or the like, one or both side walls of the body are swung downwardly to unload the beets and since these vegetables are not easily bruised, normally having their top leaves remaining on, this is an entirely satisfactory method of unloading the bed of the vehicle. However, potatoes particularly are easily susceptible to damage by rough handling and therefore require an entirely different manner of treatment.

For the purpose of handling potatoes and the like, a pair of bunk members indicated generally by the reference characters 46 and 48 are utilized. As seen most clearly in Figure 1, each of the bunk members comprises a plurality of upright frame members 50 which are adapted to abut against the inside surface of the side walls 38 and 40 and to be held against longitudinal replacement by engagement between the forward and end walls 24 and 26. Each upright is provided with a horizontal support member 52 which rests upon the floor 22.

Inclined support members 54 are also secured to the upright 50 and extend downwardly therefrom in a common plane with the horizontal support 52 and it is to be noted that the free ends of the horizontal and inclined supports are interconnected rigidly by means of a short vertical brace 56. The inclined support members 54 of each of the bunk members form a platform for the floor plate member 58 which form the effective bottom of the bunk. Vertical walls 60 are secured to the inside surfaces of the uprights 50 and abut the inclined supports 54 at their lower edges in the manner shown. An extension 62 is provided in conjunction with each wall member 60 and will be seen to consist of an elongated strip 64 having bracket members 66 secured to their outer surfaces and depending therefrom. One such bracket is provided for each of the uprights 50. Projecting ear members 68 are provided on each upright and each of these members carries a horizontal, longitudinally extending lug 70 received through an elongated slot 72 in the lower portion of each bracket such that the extensions are movable between a position such as that shown in Figure 4 wherein the strips 64 are disposed substantially horizontally in an out-of-the-way position and a position such as that shown in Figure 3 wherein the strips 64 form vertical extensions of the wall members 60. The purpose of this construction is to permit the potato loading device to be located as close to the floor plate 58 as is possible when initial loading of the bed occurs, preventing the potatoes from falling too great a distance and therefore bruising and damaging the produce. When the potatoes have attained a height approaching the uppermost edge of the vertical walls 60, the extension may be easily positioned in the manner shown in Figure 3 wherein the lower ends 74 of the brackets 66 are disposed and positively locked between the inner surface of the side walls 38 and 40 and the outer surfaces of the wall members 60.

A conveyor assembly indicated generally by the reference character 76 is disposed between the bunk members 46 and 48 and will be seen to consist of a pair of spaced side rail members 78 and 80 against which the inner edges of the bunk members engage such that they are properly positioned laterally within the bed and between the side walls 38 and 40. A plurality of roller members 82 are journaled between these pairs of side rails and it is to be noted that the side rails of each pair are interconnected by means of vertical members 84 at spaced points therealong.

It will be noted that the length of the conveyor assembly 76 is such as to project outwardly through the tailgate opening 28 where it may lead to a discharge chute or the like, and it is to be also noted that any desired means may be utilized in driving the conveyor mechanism. In this respect, the end roller shaft 86 may be provided with a sprocket or a pulley about which a chain or belt is trained for driving purposes.

Referring now more particularly to Figures 5 and 6, the modified structure shown herein will be seen to consist of a pair of main floor members 88 and 90 supported by the cross pieces 92 carried by the longitudinal bed members 94 and it will be seen that the inner edges of these floor pieces are spaced apart to permit a conveyor assembly 96 to be positioned therebetween. The conveyor assembly consists of a plurality of rollers 98 journaled by means of bearings 100 supported by the cross pieces 102 extending between members 94 and an endless flexible belt 104 is trained thereover. The upper flight 106 of the belt is disposed slightly below the level of the floor members 88 and 90 such that strips of planking or the like may be supported transversely on an angle member 108 to form a continuous floor piece when the conveyor assembly is not to be utilized or when the body is to be utilized as a normal flat bottom bed.

In this manner, it will be seen that the conveyor mechanism is always mounted in readiness on the vehicle body and it is to be noted that the rear portion thereof projects through the tailgate opening 110 and that the forward roller 112 is disposed forwardly of the front wall member 114 so that the endless belt 116 operated by the internal combustion engine 118 may be mounted on a pulley (not shown) common with this roller 112 for driving the conveyor assembly. The bunk members 120 and 122 are identical with those previously described with the exception that the horizontal and inclined support members 124 and 126 intersect and are rigidly secured to each other at their free ends such that the floor plate members 128 terminate at the level of the floor members 88 and 90.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In a truck body having a floor, a pair of swingable side walls, a forward end wall and a tailgate; a pair of bunk members adapted to be positioned between said side walls, each of said bunk members including a plurality of spaced uprights abutting the inner surface of its associated side walls, a horizontal support secured to each of said uprights and resting upon said floor, an inclined support secured to each of said uprights extending downwardly therefrom for connection at its free end to a corresponding horizontal support, a floor plate overlying and secured to said inclined supports, a vertical wall member secured to said uprights and extending above said floor plate, an extension swingably secured to said uprights and movable between a laterally projecting position and a position wherein its lower edge abuts the upper edge of said vertical wall member, said bunk members terminating in spaced relation such as to leave a space therebetween extending longitudinally and centrally of said body floor, and a conveyor disposed between said bunk members and in said space, said conveyor including a pair of spaced side rails abutting against and spacing said bunks, a plurality of rollers journalled between said side rails, and an endless flexible belt trained over said rollers.

2. The truck body of claim 1 wherein there is a swingable tail gate which fits flush against said bunk member when in the closed position, and said tail gate having an opening through which said conveyor is passed.

References Cited in the file of this patent

UNITED STATES PATENTS

| | | |
|---|---|---|
| 1,319,312 | Tremain | Oct. 21, 1919 |
| 2,015,879 | Twente | Oct. 1, 1935 |
| 2,411,133 | Hill | Nov. 12, 1946 |
| 2,451,880 | Seckel | Oct. 19, 1948 |
| 2,466,923 | Woodard | Apr. 12, 1949 |
| 2,591,556 | Knutson | Apr. 1, 1952 |
| 2,609,952 | Balzer et al. | Sept. 9, 1952 |
| 2,668,629 | Dahlman | Feb. 9, 1954 |

FOREIGN PATENTS

| | | |
|---|---|---|
| 197,252 | Great Britain | May 10, 1923 |